(12) United States Patent
Huber et al.

(10) Patent No.: US 10,522,265 B2
(45) Date of Patent: *Dec. 31, 2019

(54) SOLID INSULATION MATERIAL

(71) Applicant: Siemens Aktiengesellschaft, Munich (DE)

(72) Inventors: Jürgen Huber, Erlangen (DE); Dieter Schirm, Breitengüssbach (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 74 days.

This patent is subject to a terminal disclaimer.

(21) Appl. No.: 15/743,955

(22) PCT Filed: May 20, 2016

(86) PCT No.: PCT/EP2016/061390
§ 371 (c)(1),
(2) Date: Jan. 11, 2018

(87) PCT Pub. No.: WO2017/012739
PCT Pub. Date: Jan. 26, 2017

(65) Prior Publication Data
US 2018/0204650 A1    Jul. 19, 2018

(30) Foreign Application Priority Data
Jul. 17, 2015  (DE) .................. 10 2015 213 534
Jul. 22, 2015  (DE) .................. 10 2015 213 815

(51) Int. Cl.
*H01B 3/40* (2006.01)
*C08K 5/3445* (2006.01)
(Continued)

(52) U.S. Cl.
CPC ........... *H01B 3/40* (2013.01); *C08G 59/5073* (2013.01); *C08K 5/3445* (2013.01); *C08L 63/00* (2013.01); *H02K 3/30* (2013.01); *C08L 2203/16* (2013.01)

(58) Field of Classification Search
CPC .... H01B 3/40; C08G 59/5073; C08K 5/3445; C08L 63/00; C08L 2203/16; H02K 3/30
(Continued)

(56) References Cited

U.S. PATENT DOCUMENTS

2007/0252449 A1 * 11/2007 Ikeda ................. H01B 3/40
                                                              310/45
2017/0240693 A1    8/2017 Huber et al.
(Continued)

FOREIGN PATENT DOCUMENTS

CA      2571054 A    1/2006    ............... H01B 3/04
CN    102942682 A    2/2013    ........... C07D 233/58
(Continued)

OTHER PUBLICATIONS

Database WPI, Week 199612, Thomson Scientific, London, GB, AN 1996-112760, XP002760640, & JP H08 12744 A (Matsushita Denki Sangyo KK), 2 pages, 1996.
(Continued)

*Primary Examiner* — William K Cheung
(74) *Attorney, Agent, or Firm* — Slayden Grubert Beard PLLC

(57) ABSTRACT

The invention relates to a solid, in particular strip-shaped insulation material, to the use thereof in a vacuum impregnation method and a thus produced insulation system and to an electric machine using the insulation system, in particular for the medium and high voltage range, that is for medium and high voltage machines, in particular rotating electric machines in the medium and high voltage range and to (Continued)

semi-finished products for electric switching systems. According to the invention, the curing catalyst is a covalently-bridged di-imidazol derivative and/or a covalently-bridged di-pyrazol derivative.

17 Claims, 2 Drawing Sheets

(51) Int. Cl.
 *H02K 3/30* (2006.01)
 *C08L 63/00* (2006.01)
 *C08G 59/50* (2006.01)
(58) Field of Classification Search
 USPC ........................................ 428/411.1
 See application file for complete search history.

(56) References Cited

U.S. PATENT DOCUMENTS

| | | | |
|---|---|---|---|
| 2017/0310184 A1 | 10/2017 | Huber et al. | |
| 2019/0089217 A1* | 3/2019 | Huber | ............. H02K 3/40 |

FOREIGN PATENT DOCUMENTS

| | | | | |
|---|---|---|---|---|
| DE | 102014219844 A1 | 3/1916 | ............... | H01B 3/30 |
| DE | 102014221715 A1 | 4/1916 | ............. | C08G 59/40 |
| DE | 102015204885 A1 | 9/1916 | ................ | C08J 3/24 |
| DE | 102015205328 A1 | 9/1916 | ........... | C09J 171/02 |
| DE | 102014000992 A1 | 7/2015 | ............. | C08G 18/06 |
| EP | 1850460 A2 | 10/2007 | ............... | H01B 3/40 |
| JP | 0812744 A | 1/1996 | ............. | C08G 59/30 |
| JP | 2014177525 A | 9/2014 | ............. | C08G 59/50 |
| RU | 2332736 C1 | 8/2008 | ............... | H01B 3/04 |
| WO | 2017/012739 A1 | 1/1917 | ........... | C08K 5/3445 |
| WO | 2015/113930 A1 | 8/2015 | ............. | C08G 59/40 |

OTHER PUBLICATIONS

Database WPI, Week 201372, Thomson Scientific, London, GB, AN 2013415508, XP002760642, & CN 102 942 682 A (Univ East China Sci&Technology), 1 page, Feb. 27, 2013.
Database WPI, Week 201466, Thomson Scientific, London, GB, AN 2014-R59234, XP002760641, & JP 2014 177525 A (Asahi Denka Kogyo KK), 2 pages, 2014.
German Office Action, Application No. 102015213815.1, 7 pages, dated Nov. 17, 2015.
International Search Report and Written Opinion, Application No. PCT/EP2016/061390, 21 pages, dated Aug. 22, 2016.
Russian Office Action, Application No. 2018105690/05, 7 pages, dated Oct. 25, 2018.

* cited by examiner

SOLID INSULATION MATERIAL

CROSS-REFERENCE TO RELATED APPLICATIONS

This application is a U.S. National Stage Application of International Application No. PCT/EP2016/061390 filed May 20, 2016, which designates the United States of America, and claims priority to DE Application No. 10 2015 213 534.9 filed Jul. 17, 2015 and DE Application No. 10 2015 213 815.1 filed Jul. 22, 2015, the contents of which are hereby incorporated by reference in their entirety.

FIELD OF THE INVENTION

The invention relates to solid, more particularly tape like insulating materials, the use thereof in vacuum impregnation processes and to insulation systems produced therewith. The invention further relates to electrical machines comprising insulation systems, specifically medium-voltage and high-voltage machines, especially rotating electrical machines, and also to intermediate products for electrical switchgear.

BACKGROUND OF THE INVENTION

Electrical machines (motors, generators) have, in the multiplicity of their longitudinal grooves in the stator laminate stacks, special types of coil windings or conductor bars, generally made from copper or another material of high conductivity.

In the case of an electric motor, by supplying current in a time-selective manner, a magnetic field propagating in all directions is generated driving the freely rotating rotor suspended in the stator cavity with the rotor reacting to the induced magnetic field in the form of forced rotation, owing for example to a multiplicity of applied permanent magnets and thus, converting electrical energy into kinetic energy. In electrical terms, a stator laminate stack is at ground potential, while coils are at high kilovolt potential. The coils fitted into the stator grooves must therefore be electrically insulated with respect to ground potential. For this purpose, each and every coil is insulated with, for example, a specific tape, mica tape for example, repeatedly and with defined overlap.

Mica is used preferentially because, being a particulate, more particularly lamellar, inorganic barrier material, it is capable of retarding electrical erosion under electrical partial discharges effectively and for a long time, as for example over the entire lifetime of the machine, and has good chemical and thermal stability. Mica tapes consist of mica paper and one or more carriers, for example fabrics, film(s), which are joined to one another via a tape adhesive. Mica tapes are necessary since mica paper alone does not have the mechanical strength needed for an insulation process. Depending on application, additives may be added to the tape adhesive, examples being curing catalysts, which have an initiating effect on the thermal curing of an externally applied impregnating agent: after the mica tape-insulated coils have been fitted into the stator laminate stacks and connected electrically, for avoidance of partial discharges during later operation, the air in the cavities of the windings and especially in the groove gaps of the stator laminate stack is eliminated. Because this distance from current-carrying insulated coil to the laminate stack is generally kept as small as possible, field strengths of several kV/ram there are not unusual. There is corresponding stress on the insulation material.

Impregnating agents according to the prior art that have proven suitable for vacuum impregnation processes include thermally curable epoxy resin/anhydride mixtures.

They are used for impregnation of the stators of the electrical machines, composed of the individual parts thereof, with the fitted and mica tape-insulated coils, or for individual impregnation of coils or conductor bar.

During a specific vacuum impregnation process, the VPI (vacuum pressure impregnation) process, these stators or coils have to date been wholly flooded with a mobile epoxy resin/phthalic anhydride formulation in a vacuum chamber and then impregnated under pressure. The final cure takes place in general under atmospheric pressure in an industrial oven. The function of the curing catalyst here is to gel the mobile impregnating agent, commonly composed of epoxy resin and phthalic anhydride, within a certain time at a predetermined temperature. The industrial standard impregnating agent for this purpose to date is a mixture of distilled bisphenol A diglycidyl ether and methylhexahydrophthalic anhydride. This mixture is sufficiently mobile to ensure the complete impregnation of the tape insulation on the one hand and, in the absence of curing catalysts, a sufficient storage stability, on the other. The curing catalyst is generally present at least also in the solid insulating material, e.g., mica tape. This mica tape is held together via the tape adhesive, and so it is essential that the tape adhesive and the curing catalyst are inert to one another.

More particularly, it is advantageous if all three components, i.e., tape adhesive, curing catalyst, and charged impregnating agent, do not react until the moment they encounter one another during the VPI process. In this way, the best possible crosslinking and attachment, compatibility and non-cavitation are achieved for the insulation, this leading in turn to an optimized lifetime of the "main insulation" of the electrical machine, that comes about thereafter in the course of curing.

Owing to toxicological concerns about the unrestricted use of phthalic anhydrides, impregnating agents used in the future will be phthalic anhydride-free or completely anhydride-free, epoxide-based impregnating agents, polymerized using curing catalysts.

The new curing catalysts will be matched to the anhydride-free impregnating agents. Anhydride-free impregnating agents are known from the prior applications DE 102014219844.5, DE 102014221715.6, DE 102015205328.8, DE 102015202053.3, DE 102015208527.9, DE 102015204885.3, the disclosure content of which is hereby incorporated into the present description, will increasingly be used. Those applications describe how the curing catalysts employed to date do not produce sufficient catalysis in the case of the epoxy resin-based, anhydride-free impregnating resins which will be used in future, and so the resultant formed materials are either too soft, hence exhibiting inadequate mechanical, thermomechanical and/or thermal property values, or do not form shaped bodies at all, since the conventional catalysts simply do not cure the new impregnating resins.

Hence it has been found that nitrogen heterocycles, such as imidazoles, constitute effective gelling and/or curing catalysts for acid anhydride-free epoxy resins based on bisphenol A and/or on bisphenol F diglycidyl ether.

Thus, for example, an acid anhydride-free bisphenol F diglycidyl ether, gelled with 3 wt % of a prior-art curing catalyst, such as an N-alkyl-substituted piperazine derivative, and subjected to anionic polymerization curing at 145° C. for 10 hours, produces only a glass transition of around 90° C., whereas the standard anhydride-containing epoxy resin and curing catalyst under identical curing conditions develops a glass transition of around 160° C.

If, conversely, 2 wt % of 1,2-dimethylimidazole is used as gelling and curing catalyst for an anhydride-free impregnating resin based on epoxy resin, such as bisphenol F diglycidyl ether, for example, then the glass transition that comes about is up to 150° C.

A disadvantage of the imidazoles, however, is that the vapor pressures of the imidazoles at elevated temperatures are relatively high, and so there is a risk of partial expulsion from the mica tape binder during long-lasting evacuation phases at elevated temperatures, of the kind employed in the production of electrical machines prior to the vacuum impregnation of the stators, for the purpose of preliminary drying, for instance.

This may also be accompanied by the disadvantageous phenomenon of entrainment of the volatile imidazoles into the VPI resin reservoir during the impregnating phase, something which in turn shortens the storage stability of the impregnating resin itself.

SUMMARY OF THE PREFERRED EMBODIMENTS OF THE INVENTION

It is an object of the invention, therefore, to provide a solid insulating material with a curing catalyst that overcomes the disadvantages of the prior art, especially in connection with the use of anhydride-free impregnating resins. It is an object of the present invention, moreover, to provide for use of the solid insulating material in a vacuum impregnation process, and, lastly, to create an electrical machine having an insulating system produced in this way, with the use of the organic acid anhydrides and/or phthalic anhydrides which sensitize the respiratory pathway being generally avoided.

The achievement of this object, and subject matter of the present invention, is therefore a solid insulating material which can be used together with an anhydride-free impregnating agent for producing an insulation system in a vacuum impregnating process, said material comprising a carrier, a barrier material, a curing catalyst, and a tape adhesive, wherein the curing catalyst and the tape adhesive are inert to one another but are consumed by reaction with an anhydride-free impregnating agent under the conditions of the vacuum impregnation, with gelling times of about 1 hr. to about 15 hr. at impregnating temperature, and the curing catalyst is preferably a covalently bridged azole, e.g., a covalently bridged diimidazole derivative and/or a covalently bridged dipyrazole derivative.

A further object of the invention is the use of the insulation system thus produced in electrical machines, preferably in rotating electrical machines, more preferably in rotating electrical machines in the medium-voltage and high-voltage range, and also in electrical switchgear, medium-voltage and high-voltage applications, bushings, transformer bushings, generator bushings and/or HVDC bushings, and also in corresponding intermediate products.

A final object of the invention are electrical machines, preferably rotating electrical machines, more preferably rotating electrical machines in the medium-voltage and high-voltage range, and also electrical switchgear, medium-voltage and high-voltage applications, bushings, transformer bushings, generator bushings and/or HVDC bushings, and also corresponding intermediate products, which comprise an insulating system of this kind.

DETAILED DESCRIPTION OF THE PREFERRED EMBODIMENTS OF THE INVENTION

According to one embodiment of the invention, the curing catalyst is a diimidazole or dipyrazole of the general structure I and/or II

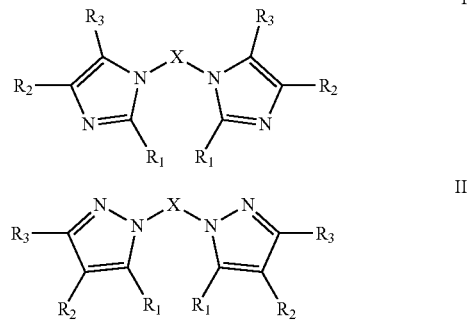

wherein
$R_1$, $R_2$, $R_3$ are alkyl and/or aryl radicals, which may be branched or unbranched, cyclic or linear, having a number of carbon atoms of 1 to 20, more particularly of 1 to 12;
The center X is, for example,
C=O
O=S=O
H—C—H
CH3-C—CH3
CH3-C—H—
C=N—R—
C=N—OR—
C=N—NHR—
C=N—NH—CO—NH2
OR—C—OR
SR—C—SR

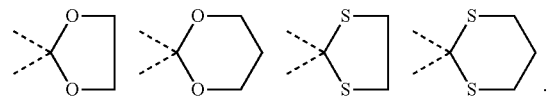

Suitable compounds may be prepared by, for example, condensing or adducting (alkyl)imidazoles or (alkyl)pyrazoles with electrophilic centers.

Thus, for example, the following diimidazoles and dipyrazoles, from the following (alkyl)imidazole or (alkyl)pyrazole reactants, have proven suitable:
1H-imidazole (CAS No. 288-32-4),
1H-2-methylimidazole (CAS No. 693-98-1),
1H-2-ethylimidazole (CAS No. 1072-62-4), but also 1H-pyrazole (CAS No. 288-3-1), 1H-3,5-dimethylpyrazole (CAS No. 67-51-6).

According to one advantageous embodiment, the condensation products used are those of (alkyl)imidazoles or (alkyl) pyrazoles with phosgene, which form with elimination of HCl. The volatility of these products is lowered further by the additional facilities for interaction via the carbonyl oxygen.

Figure 1:
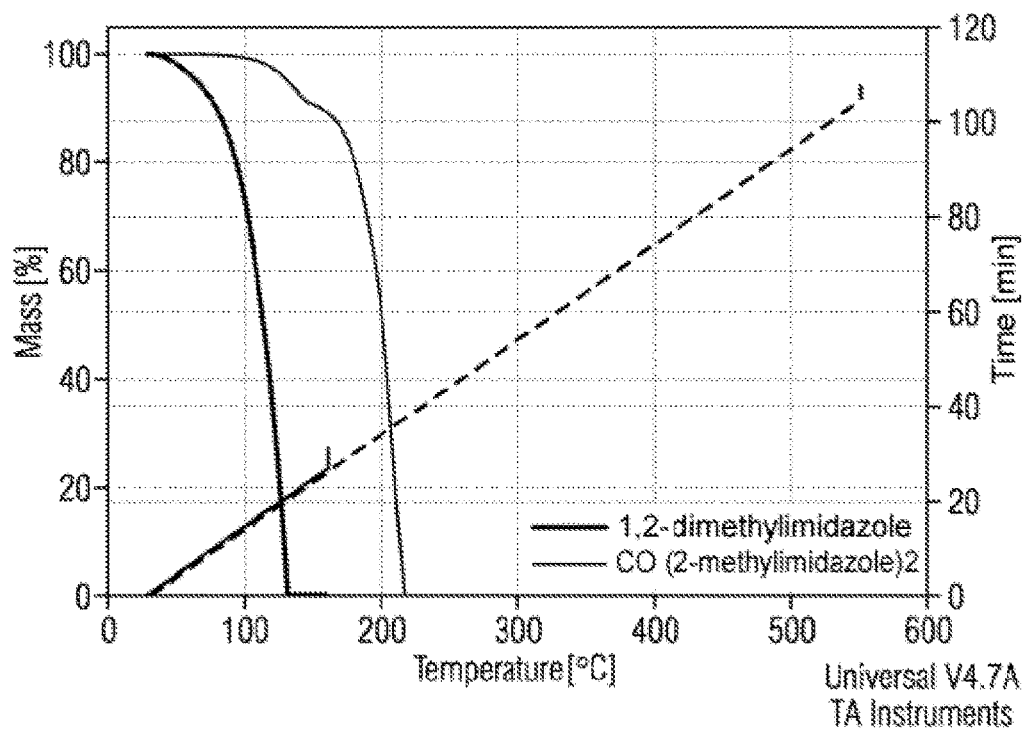
FIG. 1 shows the thermogravimetric analysis of 1,2-dimethylimidazole and 1,1'-carbonylbis (2-methyl) imidazole.

Using the example of the condensation product of phosgene and 2-methylimidazole, FIG. 1 shows the achievable decrease in the volatility of the covalently bridged di(alkyl) imidazoles according to the present invention in comparison to the conventional alkylimidazole derivatives, such as 1,2-dimethylimidazole, for example.

FIG. 1 shows the thermogravimetric analysis of 1,2-dimethylimidazole and 1,1'-carbonylbis(2-methyl)imidazole.

Figure 2:
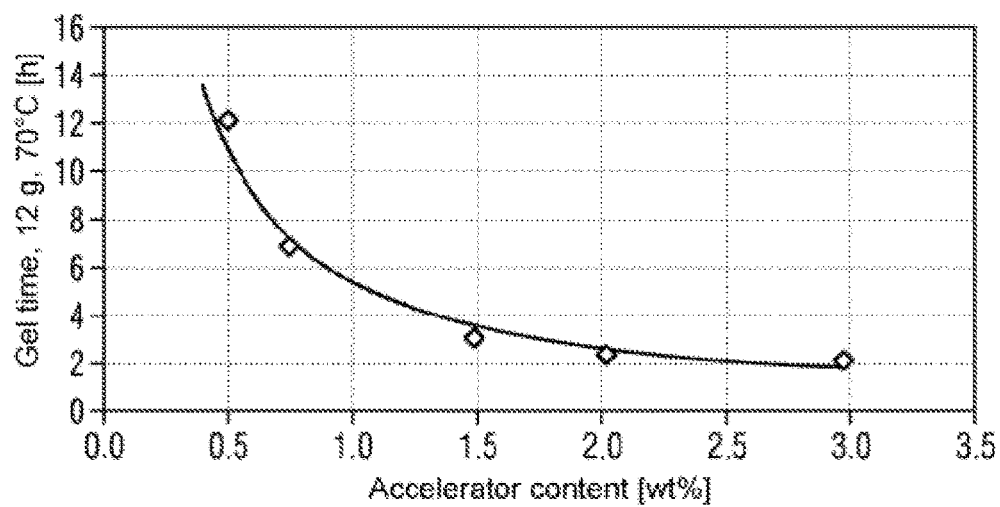
FIG. 2 shows the gel times of 1,1'-carbonylbis (2-methyl) imidazole in distilled bisphenol F diglycidyl ether (gel standard)

One of the reasons of the suitability, for the technology presently under discussion, of 1,1'-carbonylbis(2-methyl) imidazole, used here by way of example, as curing catalyst is its capacity to gel and to cure even with low levels of acid anhydride-free, epoxy resin-based impregnating resins. With just 2 wt % of 1,1'-carbonylbis(2-methyl)imidazole, relative to an acid anhydride-free bisphenol F diglycidyl ether, it is possible to set gelling times at 70° C. of between 2 and 3 hours. In this regard, FIG. 2 shows the gel times of 1,1'-carbonylbis(2-methyl)imidazole in distilled bisphenol F diglycidyl ether (gel standard).

Figure 3:
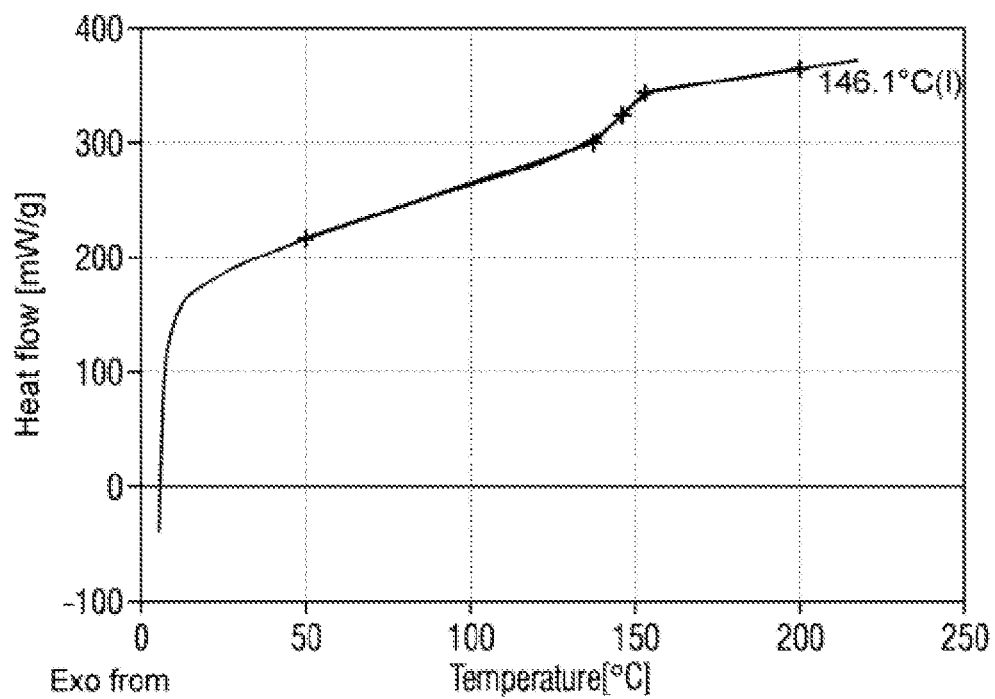
FIG. 3 shows the heat flow measurement of a molding material produced in accordance with the example described above.

FIG. 3 shows the heat flow measurement of a molding material produced in accordance with the example described above. In evidence is the glass transition temperature of a molding material cured at 180° C. for 1 hour with 3 wt % of 1,1'-carbonylbis(2-methyl)imidazole in distilled bisphenol F diglycidyl ether.

The tape adhesive used when the curing catalyst present comprises the aforesaid covalently bridged diimidazole derivatives and/or covalently bridged dipyrazole derivatives is preferably a tape adhesive of the kind described in DE 102015205328.8, the disclosure content of which is hereby made part of the subject matter of the present description.

As tape adhesive in the solid insulating material it is possible furthermore to make use, for example, of a compound selected from the following group:

tricyclomethanedimethanol (CAS No. 26896-48-0 or 26160-83-8), trimethylolpropane (CAS No. 77-99-6), dendritic, hydroxy-functional polymers (CAS No. 326794-48-3 or 462113-22-0), polycaprolactonetriols (CAS No. 37625-56-2), polycaprolactonetetrols (CAS No. 35484-93-6).

The tape adhesive joins the at least one carrier and the barrier material in the solid insulating material. It may be present in the solid insulating material in an amount in the range from about 1 to about 30 wt %, preferably from about 2 to about 15 wt %, more preferably about 5 to about 10 wt %.

In the solid insulating material there is a carrier in the form of woven, such as glass fiber fabric, nonwoven, such as nonwoven web, more particularly a polyester web, paper and/or film. The carrier in the form of a film may also be perforated.

Located on, in and/or at this carrier in the solid insulating material is the—preferably particulate—barrier material.

The barrier material is preferably at least in part lamellar. In particular, it is possible to use mica, for example, as barrier material.

According to one preferred embodiment, a coated particulate barrier material is used. This may be a particulate barrier material with metal oxide coating, examples being particles coated with tin, zinc and/or titanium oxides.

According to a further embodiment, provision is made for a doped coating of the particulate, more particularly lamellar, barrier material.

The tape adhesive joins the at least one carrier and the barrier material in the solid insulating material. It is present in the solid insulating material in an amount in the range from about 1 to about 30 wt %, preferably from about 2 to about 15 wt %, more preferably from about 5 to about 10 wt %.

According to one advantageous embodiment of the invention, the curing catalyst, also called "tape curing catalyst" or else "tape accelerator", is present in the solid insulating material at a concentration of less than about 10 wt %, as for example from about 0.001 wt % to about 7.5 wt %, preferably in the range from about 0.01 to about 5 wt %, more preferably from about 0.1 wt % to about 3.5 wt %, and so gelling times of several hours are realizable.

According to one advantageous embodiment of the invention, the curing catalyst initiates the polymerization of the impregnating resin at temperatures in the range from about 20° C. to about 100° C., preferably from about 50° C. to about 80° C., and especially preferably from about 55° C. to about 75° C.

In order to achieve a required storage stability in the solid insulating material, at room temperature for example and more particularly at a vacuum prehold and impregnating temperature going on for several hours, the curing catalyst is comparatively inert toward the tape adhesive material. This is so in particular even under the conditions of the vacuum prehold and/or impregnating temperature, which for example is in the range between about 20° C. and about 100° C., more particularly between about 50° C. to about 80° C., most preferably between about 55° C. to about 75° C. Examples of suitable tape adhesives are diols, triols and/or polyols.

The invention relates to a solid, more particularly tape-like insulating material, to the use thereof in a vacuum impregnation process and to an insulation system produced therewith, and also to an electrical machine comprising the insulation system, more particularly medium-voltage and high-voltage machines, especially rotating electrical machines in the medium-voltage and high-voltage range, and also intermediate products for electrical switchgear. The solid insulating material and the insulation system produced using it are notable for being producible without anhydride.

In comparison to the prior art of anhydride-containing impregnating resins, such as an N-alkyl-substituted piperazine derivative, for example, the condensation products, such as diimidazole derivatives and/or dipyrazole derivatives, more particularly comprising imidazole, 2-methylimidazole, and 2-ethylimidazole, are particularly suitable compounds as curing catalysts, since a) the glass transition temperatures achievable by anionic polymerization with acid anhydride-free impregnating resins based on diglycidyl ether are much higher than when using the N-alkyl-substituted piperazine derivatives;

b) (1,2-substituted) imidazoles gel and cure acid anhydride-free impregnating resins with lower contents than an N-alkyl-substituted piperazine derivative.

"Simple" (alkyl)imidazoles (e.g., 1,2-alkylimidazoles such as 1,2-dimethylimidazole) are per se not vacuum-stable and are often highly mobile liquids even at room temperature; they are therefore able very easily, under reduced pressure and at elevated temperature during the evacuating and preliminary drying phases of the stators to be impregnated, to migrate out of the mica tape binder and, in the worst case, lead to contamination of impregnating resin during the flooding phase of the VPI impregnation. The impregnating resin typically comprises around 20 metric tons and ought not to suffer any marked increase in viscosity as a result of contamination, since otherwise the resin refresh phases would have to be shortened. Contamination with accelerator from the mica tapes must therefore be avoided at all costs.

As a result of the covalent linking of two 1H-2-alkylimidazoles at the 1H position of the N-heterocycles, more particularly of the 1H-2-methylimidazole or of the 1H-2-ethylimidazole, to a center X, it is now possible to provide a curing catalyst which meets the requirements for the various impregnating classes and which has sufficiently low volatility. Moreover, the diimidazoles can be modified further in a targeted way, in order, for example, to improve properties such a resistance to hydrolysis.

It has been discovered that 1,2-dimethylimidazole with 2 wt %, based on the acid anhydride-free epoxy resin, yields high glass transitions of up to 150° C. in otherwise identical curing scenarios, whereas the prior-art curing catalyst produces only about 90° C. as a glass transition in acid anhydride-free glycidyl ether epoxy resins. Owing to the high vapor pressure of the 2-alkylimidazoles and the high fluidity, however, the dispersing of pure imidazoles into the mica tape binder is connected to the later risk of the evacuating phase (70° C., 0.1 mbar for up to 72 hours) resulting in evaporation or migration of the volatile alkylimidazole and accumulation thereof at relatively cold locations of the impregnating apparatus. Accordingly, contamination is likely at the resin flooding phase.

The covalent attachment of two alkylimidazoles to a center X reduces the volatility. This effectively retards any migration from the mica tape binder.

In accordance with the covalently bridged diimidazole derivatives and/or covalently bridged dipyrazole derivatives disclosed herein as curing catalysts, which are, for example, condensation products and/or adducts, curing catalysts in solid insulating materials, by virtue of the molecular enlargement and possible additional interactions at the formerly electrophilic center, have a lower volatility than the simple (alkyl)imidazoles. In spite of this lower volatility, the reactivity with respect to acid anhydride-free impregnating resins based on epoxy resin is only insubstantially adversely affected or not at all in comparison to simple (alkyl)imidazoles. Consequently, these systems represent excellent curing catalysts for acid anhydride-free impregnating resins based on epoxy resin.

What is claimed is:

1. A system which can be used together with an anhydride-free impregnating agent for producing a solid insulating material in a vacuum impregnating process, said system comprising:
   a carrier,
   a barrier material,
   a curing catalyst, and
   an adhesive,
   wherein the curing catalyst and the adhesive are inert to one another but are consumed by reaction with an anhydride-free impregnating agent under the conditions of the vacuum impregnation, with gelling times of about 1 hour to about 15 hours at impregnating temperature, and
   the curing catalyst comprises a covalently bridged diimidazole derivative and/or a covalently bridged dipyrazole derivative.

2. The system as claimed in claim 1, wherein the curing catalyst comprises a compound of the general structure I or II:

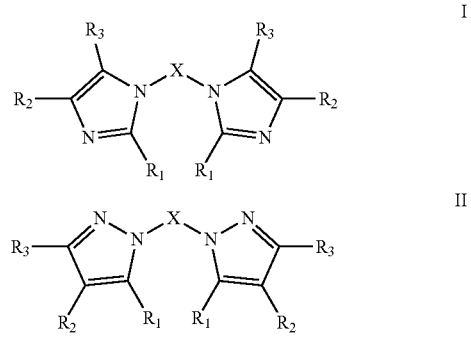

wherein
$R_1$, $R_2$, $R_3$=alkyl radicals, and/or aryl radicals, which may be derivatized or underivatized, branched or unbranched, cyclic or linear form, with a number of carbon atoms of 1 to 20;
and
the center X is a substructure selected from the group of substructures consisting of
C=O;
O=S=O;
H—C—H;
CH3-C—CH3;
CH3-C—H;
C=N—R;
C=N—OR;
C=N—NHR;
C=N—NH—CO—NH2;
OR—C—OR;
SR—C—SR;

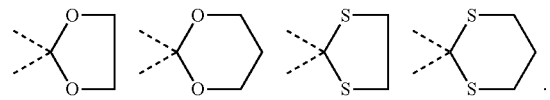

3. The system of claim 1, wherein said curing catalyst is a condensation product of an alkylimidazole or of an alkylpyrazole selected from the group of compounds consisting of
   1H-imidazole (CAS No. 288-32-4),
   1H-2-methylimidazole (CAS No. 693-98-1),
   1H-2-ethylimidazole (CAS No. 1072-62-4),
   1H-pyrazole (CAS No. 288-3-1), and
   1H-3,5-dimethylpyrazole (CAS No. 67-51-6).

4. The system of claim 1, wherein the curing catalyst comprises a compound which is a condensation product of an (alkyl)imidazole or an (alkyl)pyrazole and phosgene.

5. The system of claim 1, further comprising a second adhesive comprising an adduct of a bisphenol, diol, triol, and/or higher alcohol ("A(OH)$_n$") with cyclohexene oxide and/or with a cyclohexene oxide derivative, ("Cy"), where A(OH)$_n$ is selected from the group of compounds consisting of:

monoethylene glycol $(C_2H_4)(OH)_2$, butanediols $(C_4H_8)(OH)_2$, butenediols $(C_4H_6)(OH)_2$, butynediol $(C_4H_4)(OH)_2$, polyethylene glycols $H(OC_2H_4)_x(OH)_2$ with x=1 to 5000, propylene glycol $(C_3H_6)(OH)_2$, polypropylene glycols $H(OC_3H_6)_x(OH)_2$ with x=1 to 5000, diethylene glycol $(C_2H_8O)(OH)_2$, propanediols $(C_3H_6)(OH)_2$, neopentyl glycol $(C_5H_{10})(OH)_2$, cyclopentanediols $(C_5H_8)(OH)_2$, cyclopentenediols $(C_5H_6)(OH)_2$, glycerol $(C_3H_5)(OH)_3$, pentanediols $(C_5H_{10})(OH)_2$, pentaerythritol $(C_5H_8)(OH)_4$, hexanediols $(C_6H_{12})(OH)_2$, hexylene glycols $(C_6H_{12})(OH)_2$, heptanediols $(C_7H_{14})(OH)_2$, octanediols $(C_8H_{16})(OH)_2$, polycaprolactonediols, polycaprolactonetriols, hydroquinone $(C_6H_4)(OH)_2$, resorcinol $(C_6H_4)(OH)_2$, (pyro)catechol $(C_6H_4)(OH)_2$, rucinol $(C_{10}H_{12})(OH)_2$, triethylene glycol $(C_6H_{12})(OH)_2$, fully aromatic, partially hydrogenated and/or fully hydrogenated bisphenol A $(C_{15}H_{14})(OH)_2$, $(C_{15}H_{28})(OH)_2$, bisphenol F $(C_{13}H_{10})(OH)_2$, bisphenol S $(C_{12}H_8O_2S)(OH)_2$, tricyclodecanedimethanol $(C_{12}H_{18})(OH)_2$, and glycerol carbonate $(C_4H_5)(OH)_1$.

6. The system of claim 1, further comprising a second adhesive selected from the group of compounds consisting of:
tricyclomethanedimethanol (CAS No. 26896-48-0 or 26160-83-8),
trimethylolpropan (CAS No. 77-99-6),
dendritic, hydroxy-functional polymers (CAS No. 326794-48-3 or 462113-22-0),
polycaprolactonetriols (CAS No. 37625-56-2), and
polycaprolactonetetrols (CAS No. 35484-93-6).

7. The system of claim 1, comprising curing catalyst in an amount of less than about 10 wt %.

8. The insulating material of claim 1, wherein the adhesive is present in the range from about 1 to about 30 wt % of the insulating material.

9. The system of claim 1, further comprising a carrier in the form of woven, nonwoven and/or film.

10. The system of claim 9, wherein the carrier comprises a perforated film.

11. The system of claim 1, further comprising a particulate barrier material.

12. The system of claim 11, wherein the particulate barrier material comprises at least partly lamellar barrier material particles.

13. The system as claimed in claim 12, wherein the particles of the barrier material are coated.

14. The system of claim 13, wherein the barrier material is coated with a metal oxide.

15. The system of claim 13, wherein the barrier material coating is doped.

16. A method for producing a solid insulating material by vacuum impregnation in medium-voltage and high-voltage rotating electrical machines, the method comprising:
combining a carrier, a barrier material, a curing catalyst, and an adhesive, wherein the curing catalyst and the adhesive are inert to one another, and
reacting the curing catalyst and the adhesive with an anhydride-free impregnating agent under the conditions of the vacuum impregnation, with gelling times of about 1 hour to about 15 hours at impregnating temperature, and thereby consuming the curing catalyst and the adhesive,
the curing catalyst comprises a covalently bridged diimidazole derivative and/or a covalently bridged dipyrazole derivative.

17. The system of claim 2, wherein $R_1$, $R_2$, and $R_3$ comprise 1 to 12 carbon atoms.

* * * * *